US011704071B1

(12) United States Patent
Yasser et al.

(10) Patent No.: US 11,704,071 B1
(45) Date of Patent: Jul. 18, 2023

(54) DELEGATING LOW PRIORITY TASKS TO A PASSIVE STORAGE CONTROLLER

(71) Applicant: Lenovo Global Technology (United States) Inc., Morrisville, NC (US)

(72) Inventors: Mohammed Arakkal Kunju Yasser, Bangaluru (IN); Vinay Bapat, Bangalore (IN); Roberto H Jacob Da Silva, Oak Park, CA (US); Hari Om Sharma, Bangalore (IN); Radu Mihai Iorga, Bucharest (RO)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 0 days.

(21) Appl. No.: 17/706,472

(22) Filed: Mar. 28, 2022

(51) Int. Cl.
 *G06F 12/00* (2006.01)
 *G06F 3/06* (2006.01)

(52) U.S. Cl.
 CPC ............ *G06F 3/0659* (2013.01); *G06F 3/067* (2013.01); *G06F 3/0619* (2013.01); *G06F 3/0664* (2013.01)

(58) Field of Classification Search
 None
 See application file for complete search history.

(56) References Cited

U.S. PATENT DOCUMENTS

| 2012/0297134 | A1* | 11/2012 | Parthasarathy | G06F 3/061 711/E12.001 |
|---|---|---|---|---|
| 2019/0065204 | A1* | 2/2019 | Jean | G06F 9/3004 |
| 2019/0129876 | A1* | 5/2019 | Trika | G06F 3/0683 |
| 2021/0042051 | A1* | 2/2021 | Ito | G06F 3/0659 |

* cited by examiner

*Primary Examiner* — Daniel D Tsui
(74) *Attorney, Agent, or Firm* — Jeffrey L. Streets; Streets Lawfirm, PC

(57) ABSTRACT

A computer program product and a data storage device including first and second storage controllers operating in active-passive mode with a shared disk. Each storage controller includes a storage device storing program instructions and a processor to process the program instructions and perform various operations. The operations include receiving a task to be performed by the storage device containing the first and second storage controllers, wherein the first storage controller is currently operating as an active storage controller and the second storage controller is currently operating as a passive storage controller. The operations further include determining whether the received task has a high priority or a low priority, performing the received task in response to determining that the received task has a high priority, and delegating the received task to the second storage controller for performance in response to determining that the received task has a low priority.

20 Claims, 3 Drawing Sheets

DELEGATING LOW PRIORITY TASKS TO A PASSIVE STORAGE CONTROLLER

BACKGROUND

The present disclosure relates to the operation of a data storage device having two storage controllers that operate in an active-passive mode.

BACKGROUND OF THE RELATED ART

A data storage device may be designed with two storage controllers that share access to the data storage media, such as one or more storage disks. The two storage controllers may be configured to operate in an active-passive mode such that one of the storage controllers operates as the active storage controller and the other of the storage controllers operates as the passive storage controller. Whichever one of the two storage controllers is currently designated as the active storage controller has exclusive access to all the storage disks. However, at any point that there is a failure in the storage controller that has been operating as the active storage controller, the other storage controller that has been operating as the passive storage controller will automatically being operating as the active storage controller. During the transition or failover from one storage controller to the other storage controller to operate as the active storage controller, there is ideally little or no downtime for the users of virtual disks exposed by the data storage device. The data storage device with the two storage controllers operating in an active-passive mode may thus experience very little downtime even when a storage controller fails and is therefore sometimes referred to as a high availability storage. An event that causes a storage controller to take over as the active storage controller may be referred to as a high availability event.

BRIEF SUMMARY

Some embodiments provide a computer program product comprising a non-transitory computer readable medium and program instructions embodied therein, the program instructions being configured to be executable by a processor of a first storage controller to cause the processor to perform various operations. The operations comprise receiving a task to be performed by a storage device containing the first storage controller and a second storage controller, wherein the first storage controller is currently operating as an active storage controller and the second storage controller is currently operating as a passive storage controller. The operations may further comprise determining whether the received task has a high priority or a low priority, performing the received task in response to determining that the received task has a high priority, and delegating the received task to the second storage controller in response to determining that the received task has a low priority.

Some embodiments provide a data storage device comprising at least one data storage drive and first and second storage controllers operating in active-passive mode, wherein one of the first and second storage controllers operates as an active storage controller and the other of the first and second storage controllers operates as a passive storage controller, and wherein the active storage controller controls reading and writing to the at least one data storage drive. Each of the first and second storage controllers includes at least one non-volatile storage device storing program instructions, and at least one processor configured to process the program instructions, wherein the program instructions are configured to, when processed by the at least one processor, cause the processor to perform various operations. The operations comprise receiving a task to be performed by a storage device containing the first storage controller and a second storage controller, wherein the first storage controller is currently operating as an active storage controller and the second storage controller is currently operating as a passive storage controller. The operations may further comprise determining whether the received task has a high priority or a low priority, performing the received task in response to determining that the received task has a high priority, and delegating the received task to the second storage controller in response to determining that the received task has a low priority.

DETAILED DESCRIPTION

Figure 1:
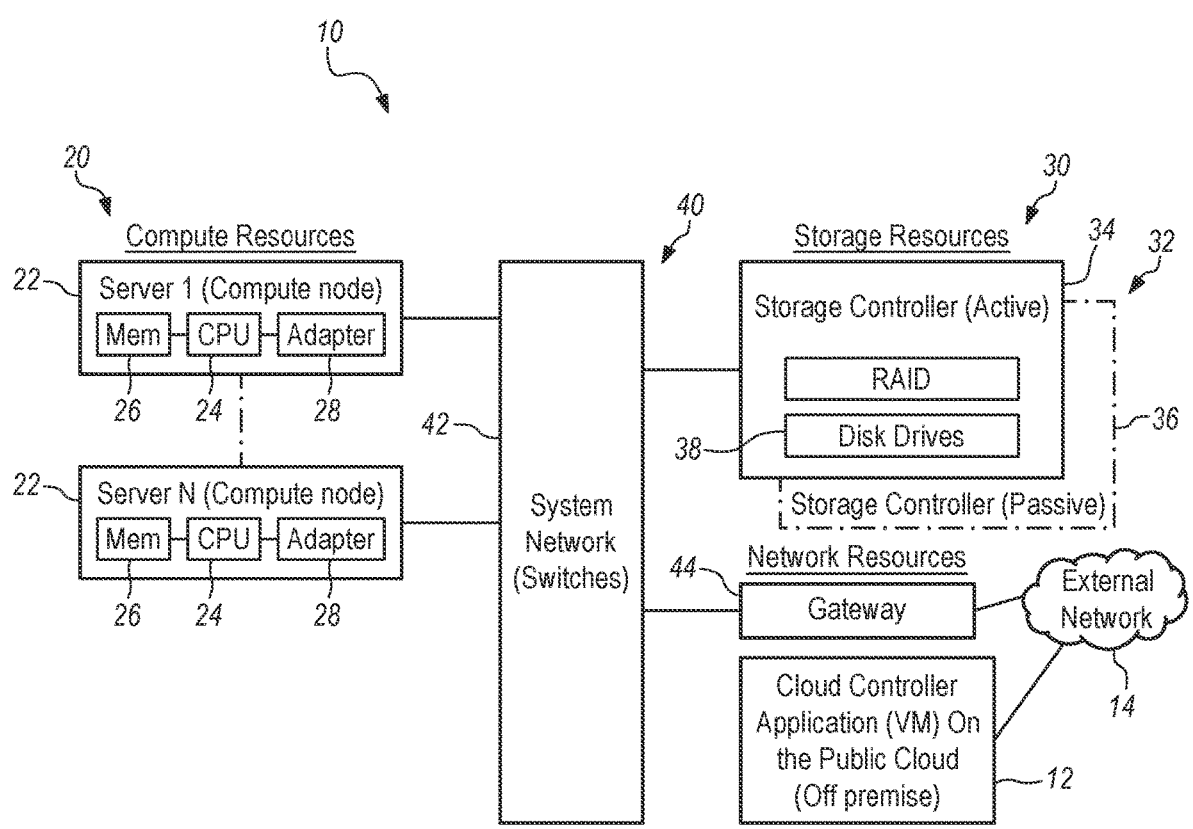
FIG. 1 is a diagram of a composable computing system in communication with a virtual machine on a public cloud via an external network.

Some embodiments provide a computer program product comprising a non-transitory computer readable medium and program instructions embodied therein, the program instructions being configured to be executable by a processor of a first storage controller to cause the processor to perform various operations. The operations comprise receiving a task to be performed by a storage device containing the first storage controller and a second storage controller, wherein the first storage controller is currently operating as an active storage controller and the second storage controller is currently operating as a passive storage controller. The operations may further comprise determining whether the received task has a high priority or a low priority, performing the received task in response to determining that the received task has a high priority, and delegating the received task to the second storage controller in response to determining that the received task has a low priority.

The storage device, also referred to as a data storage device, may have an architecture designed to support high availability using two storage controllers operating in an active-passive mode, where the two storage controllers share data storage media such as a set of disk drives. At any point in time, one of the two storage controllers operates as the active storage controller and another of the two storage controllers operates on standby as the passive storage controller. The active storage controller has exclusive access to the data storage media. If the active storage controller experiences a failure event or unacceptable performance degradation, the passive storage controller is available to automatically take over as the active storage controller and will then have exclusive access to the data storage media. Although the CPU and memory resources of the passive storage controller are typically idle and unused unless and until the passive storage controller takes over as the active storage controller, embodiments herein make use of the CPU and memory resources of the passive storage controller to perform low priority tasks.

In some embodiments, the data storage device may implement an active-passive high-availability (HA) policy for the storage media and an active-active high-availability (HA) policy for the compute resources of the two storage controllers, including the processors and local memory of the two storage controllers. Specifically, the active-passive high-availability (HA) policy for the storage media requires that a first (active) storage controller have exclusive access to the storage media and that a second (passive) storage controller would take over exclusive access to the storage media in response to a failover or high-availability event causing the second (previously passive) storage controller to become the current active storage controller and the first (previously active) storage controller to become the current passive storage controller. The active-active high-availability (HA) policy for the compute resources of the two storage controllers enables load balancing and/or delegation of tasks among the compute resources of the two storage controllers. In accordance with the active-active high-availability (HA) policy for the compute resources of the two storage controllers, the active storage controller receives task and determines whether to process or perform the task itself using the processor and local memory resources of the active storage controller or whether to delegate the task to the passive storage controller to process or perform using the processor and local memory resources of the passive storage controller. Using the active-active high-availability (HA) policy for the compute resources of the two storage controllers may allow the active storage controller to see and access double (i.e., twice) the amount of processor and local memory resources for performing the received tasks, and may result in a 70 percent (%) to 80 percent (%) performance improvement as to at least the low priority tasks while also providing greater resource availability to the high priority tasks and reducing competition for the processor and local memory resources of the active storage controller.

Some embodiments that implement the active-active high-availability (HA) policy for the compute resources of the two storage controllers may further provide operations for handling or recovering tasks that are being performed by the compute resources (processor(s) and/or local memory) of a passive storage controller but are not yet completed and become disrupted at the time of a failover or high-availability event. The occurrence of a failover or high-availability event means that the storage controller that has been operating as the passive controller will take over as the active storage controller and, conversely, the other storage controller that has been operating as the active storage controller will become the passive storage controller. However, the HA event may cause tasks being performed by the passive storage controller to become disrupted. In one option, the tasks being performed by a first storage controller operating as a passive storage controller may, in response to an HA event causing the first storage controller to become the new active storage controller, be automatically restarted on the second storage controller operating as the new passive storage controller. However, in a further option, if the second storage controller that was operating as the active storage controller fails to become the new passive storage controller, then the first storage controller that was operating as a passive storage controller may, in response to an HA event causing the first storage controller to become the new active storage controller, prompt a user to restart any one or more of the tasks that were being performed by the first storage controller at the time of the HA event to be performed on the new active storage controller. Alternatively, the user may restart any one or more of the tasks when a healthy HA state of Active-Passive is resumed after failover event.

In some embodiments that implement the active-active high-availability (HA) policy for the compute resources of the two storage controllers, tasks that were being performed by the compute resources (processor(s) and/or local memory) of a passive storage controller before being disrupted by a failover or high-availability event may be resumed rather than being restarted. One option for resuming a disrupted task may include storing the operation progress (state information) of the task in a configuration file, sync the configuration file across the local memory of both of the storage controllers, and then resume the task on the either of the storage controllers. For example, if the task was previously being performed on a first storage controller serving as the passive controller and was disrupted by an HA event causing the first storage controller to become the active controller, the task may be resumed on the second storage controller that becomes the passive controller after the HA event by using the configuration file synced and stored on the memory of the second storage controller. Optionally, the new active storage controller may be responsible for instructing the new passive storage controller to resume a disrupted task.

In some embodiments, the storage device may provide network storage to any number of devices. For example, a composable computing system may include the storage device and a plurality of compute nodes that each run a hypervisor supporting the operation of virtual machines. Optionally, the composable computing system may form a composable private cloud. A Composable Private Cloud Infrastructure is an aggregate of compute (server), storage and network switches, operated as a single on-premises data center. The infrastructure may be managed, configured and monitored by a centralized Cloud Controller application, which is either hosted on the composable private cloud or on a public cloud, such as Amazon Web Services (AWS) or Azure, referred to as off-premises.

In some embodiments, the low priority tasks may be identified as those tasks that have little or no direct benefit for workloads running in virtual machines but may still place a high load on the CPU and memory resources of the storage controller performing these low priority tasks. Embodiments enable the active storage controller to delegate any one or more low priority task to be performed by the compute resources (processor(s) and memory) of the passive storage controller. In this manner, the active controller deal may use its compute resources (processor(s) and memory) on more important storage tasks, like serving the virtual machines that are performing the workloads.

Examples of these low priority tasks include, without limitation, template creation and image conversion. A virtual disk template may be used to duplicate properties and settings in order to create virtual disks in a standardized fashion. Such templates may be used to create virtual disks that uniformly fulfill the requirements of applications they are intended to support. A storage controller may be responsible for template creation or image conversion because the storage controller holds the datastore for virtual disks (vdisks) used by the virtual machines. The storage controller may host the utilities necessary for performing these tasks and may use memory to store templates, snapshots, converted files, and the other data. A storage snapshot is an image-level view of stored data at a particular point in time. One or more of the low priority tasks may be user-initiated, such as template creation or a virtual machine update. Furthermore, one or more of the low priority tasks may be policy driven, such as snapshots, migration, or backup. In a further example, virtual machine creation from a template might be a high priority task, a virtual machine upgrade (add and attach) might be a high priority task, creating a template from a virtual machine might be a low priority task, local and disaster recover snapshots might be a medium priority task, virtual machine migration to/from other solutions might be a low priority task, downloading marketplace templates may be a low priority task, calculating a checksum for a disk file might be a low priority task, and a virus scan of a disk file might be a low priority task. In contrast to the storage controller CPU and memory resources, the CPU and memory resources of the compute nodes are only used to run the hypervisor that supports the virtual machines and the iSCSI initiator operations for the virtual machines.

In some embodiments, a network storage device that implements an active-passive, high availability (HA) architecture with dual storage controllers may dedicate the central processing unit (CPU) of the active storage controller to the traffic which has to traverse multiple storage layers in an operating system, such as layers for protocol (such as Internet Small Computer Systems Interface (iSCSI) protocol or Fibre Channel (FC)), block (such as thin-provisioning in linux), file system (such as ext4, xfs, vmfs, ntfs), disk redundancy (such as Redundant Array of Independent Disks (RAID), and/or disk encryption (such as self-encrypting drive (SED) using utilities like dm-crypt). By delegating low priority tasks to the other storage controller that is currently operating as the passive storage controller, the storage controller that is currently operating as the active storage controller may use a greater portion of its CPU and memory resources to support the data storage tasks required by the virtual machines.

In some embodiments, the operations may further include storing a list of tasks and a predetermined priority associated with each task. For example, the list may be stored in memory associated with each of the storage controller, so that the list is available to either of the storage controllers that is operating as the active storage controller. The operation of determining whether the received task has a high priority or a low priority may be performed by identifying the received task in the list of tasks and reading the predetermined priority associated with the received task. In one option, the list of tasks may include template creation and image conversion each having a predetermined association with a low priority, and wherein the list of tasks includes a storage task having a predetermined association with a high priority. In a separate option, the list of tasks may include a snapshot, migration, and backup each having a predetermined association with a low priority. In a further option, the list of tasks may include calculating a checksum of a disk file and performing a virus scan of a disk file having a predetermined association with a low priority.

In some embodiments, the operations may further include storing a list of task types and a predetermined priority associated with each task type. For example, each task type may be assigned a predetermined priority and any received task within a given task type will be handled with the predetermined priority assigned to tasks of that task type. The operation of determining whether the received task has a high priority or a low priority may be performed by identifying a task type for the received task and identifying the predetermined priority associated with the identified task type. In one option, the received task may be determined to have a high priority in response to receiving the task from a virtual machine running on a compute node in the same network as the storage device. In other words, the task type may identify a task source and the priority may be determined as a function of the task source.

In some embodiments, a centralized logic, such as a cloud controller application, may be used to assign a task priority to a task. For example, a task may have a predefined task priority and/or a user-customizable association between task priority and pools or types of tasks. For example, the tasks that are predefined to be low priority tasks may include all template creation tasks and all backup tasks. In another example, user configurable priorities may be used to define other low priority tasks, such as encryption, and/or override default low priority tasks, such as template creation. An authorized user may interface with the cloud controller application to establish user-defined task priorities for the storage device. The cloud controller application may then send the list of tasks and the predetermined priority associated with each task over a network to the storage controllers of the storage device. The active storage controller may subsequently use the list to make priority determinations any time that a task is received.

In some embodiments, the passive storage controller will perform the tasks that the active storage controller delegates to the passive storage controller. Upon completion of the task, the passive storage controller my notify the active storage controller and/or the cloud controller application of the task completion. Optionally, a result of the completed task may be provided to the active storage controller. Accordingly, the active storage controller may take any further action necessary after completion of the task, such as reporting to the cloud controller application, reporting to a virtual machine, or storing a result on the storage media.

In some embodiments, the active storage controller receives some tasks over a network from a cloud controller application and/or receives other tasks over the network from virtual machines. The cloud controller application may be run on a compute node in the same network as the storage device but may alternatively be run on a public cloud that can communicate with the active storage controller via a gateway between an external network and the system network. The virtual machines may be run on compute nodes in the same network as the storage device, such as within the same composable system, and each virtual machine may be assigned a virtual disk exposed as an iSCSI target by the active storage controller. In one option, the operation of determining whether the received task has a high priority or a low priority includes receiving a priority associated with the task from the virtual machine. Specifically, the priority level of a new task may be assigned by the virtual machine (VM) that has generated or submitted the new task. For example, a virtual machine that is performing a machine learning (ML) algorithm will need the storage device to perform at high input/output operations per second (IOPS) and may therefore assign a high priority to any new task related to the machine learning algorithm. However, the same virtual machine may assign a low priority to saving a large file on the disk of the storage device. The virtual machine performing the machine learning algorithm or other application program may send all new tasks to the active storage controller, but the active storage controller can delegate responsibility of performing one or more new task to the passive storage controller if the new task is determined to have a low priority. Other types of workloads may be similarly run as virtual machines, which are created and started from the compute nodes that host a hypervisor service. These workloads, in turn, make use of persistent storage, provided via virtual disks exposed as iSCSI targets by the active storage controller of the storage device.

Some embodiments provide a data storage device comprising at least one data storage drive and first and second storage controllers operating in active-passive mode, wherein one of the first and second storage controllers operates as an active storage controller and the other of the first and second storage controllers operates as a passive storage controller, and wherein the active storage controller controls reading and writing to the at least one data storage drive. Each of the first and second storage controllers includes at least one non-volatile storage device storing program instructions, and at least one processor configured to process the program instructions, wherein the program instructions are configured to, when processed by the at least one processor, cause the processor to perform various operations. The operations comprise receiving a task to be performed by a storage device containing the first storage controller and a second storage controller, wherein the first storage controller is currently operating as an active storage controller and the second storage controller is currently operating as a passive storage controller. The operations may further comprise determining whether the received task has a high priority or a low priority, performing the received task in response to determining that the received task has a high priority, and delegating the received task to the second storage controller in response to determining that the received task has a low priority.

The foregoing data storage device may include first and second storage controllers that execute program instructions for implementing or initiating any one or more operation of the computer program products described herein. Accordingly, a separate description of the computer program product will not be duplicated in the context of a data storage device.

FIG. 1 is a diagram of a composable computing system 10 in communication with a cloud controller application 12, which may run in a virtual machine of a public cloud. The composable computing system 10 includes compute resources 20, storage resources 30 and network resources 40. The compute resources 20 may include a plurality of compute nodes 22, such as servers, each including a central processing unit (CPU) 24, memory 26, and a network adapter 28. The storage resources 30 may include various data storage devices, which may be configured to provide network data storage to the compute nodes 22. At least one data storage device 32 includes two storage controllers that operate in an active-passive mode, where one of the storage controllers operates as an active storage controller 34, another of the storage controller operates as a passive storage controller 36, and the storage media, such as disk drives 38, are shared by the two storage controllers. The network resources 40 includes any number of network switches 42 and a gateway 44 that supports communication between the components of the composable computing system 10 and an external network 14. For example, the network switches 42 and the gateway 44 enable the could controller application 12 to communicate with the storage controllers 34, 36 and other components of the composable computing system 10.

Figure 2:
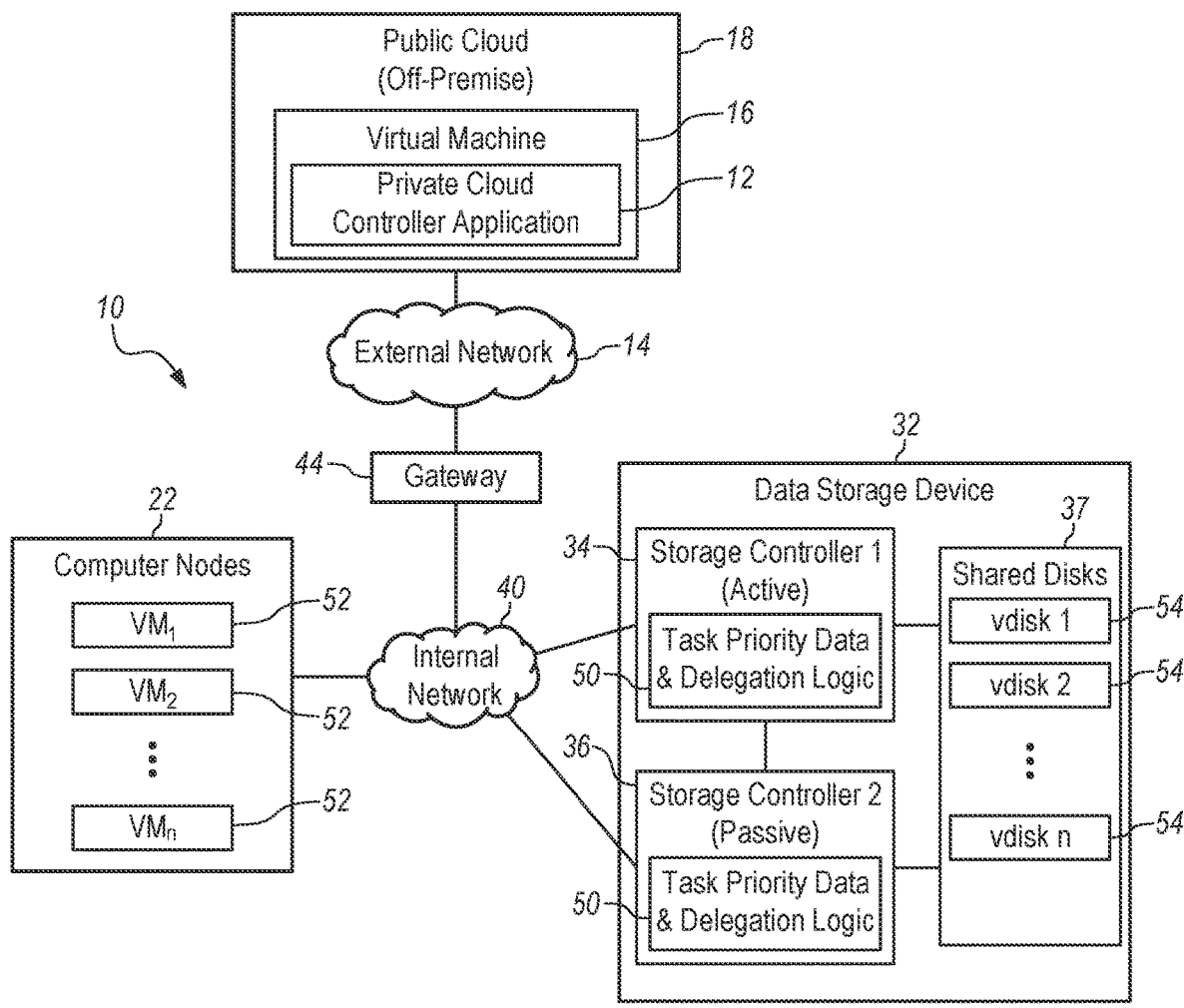
FIG. 2 is a diagram of the composable computing system with a data storage device having two storage controllers operating in active-passive mode.

FIG. 2 is a diagram of the composable computing system 10 illustrating the data storage device 32 having two storage controllers 34, 36 operating in active-passive mode. Each storage controller 34, 36 runs a computer program product that includes task priority data and delegation logic 50. For example, the task priority data and delegation logic 50 may include a list of tasks and a predetermined priority for each task. The list may be prepared by the private cloud controller application 12, which may run in a virtual machine 16 of a public cloud 18. As shown, the list may be sent to the storage controllers 34, 36 from the private cloud controller application 12 via the external network 14, the gateway 44 and the internal network 40. Furthermore, the task priority data and delegation logic 50 may include program instructions that are executable by a processor in each storage controller 34, 36 to cause the active storage controller to receive new tasks, determine the priority of those received tasks, perform the received tasks that are determined to have a high priority, and delegate the received tasks that are determined to have a low priority to be performed by the passive storage controller. As illustrated in FIG. 2, the first storage controller 34 ("Storage Controller 1") is shown to be operating as the active storage controller and the second storage controller 36 ("Storage Controller 2") is shown to be operating as the passive storage controller. Accordingly, the first storage controller 34 is currently responsible for input/output to and from the shared disks 37. For example, the virtual machines 52 that are supported by hypervisors running on the compute nodes 22 may each be assigned a virtual disk 54 to support the data storage needs of the virtual machine.

Figure 3:
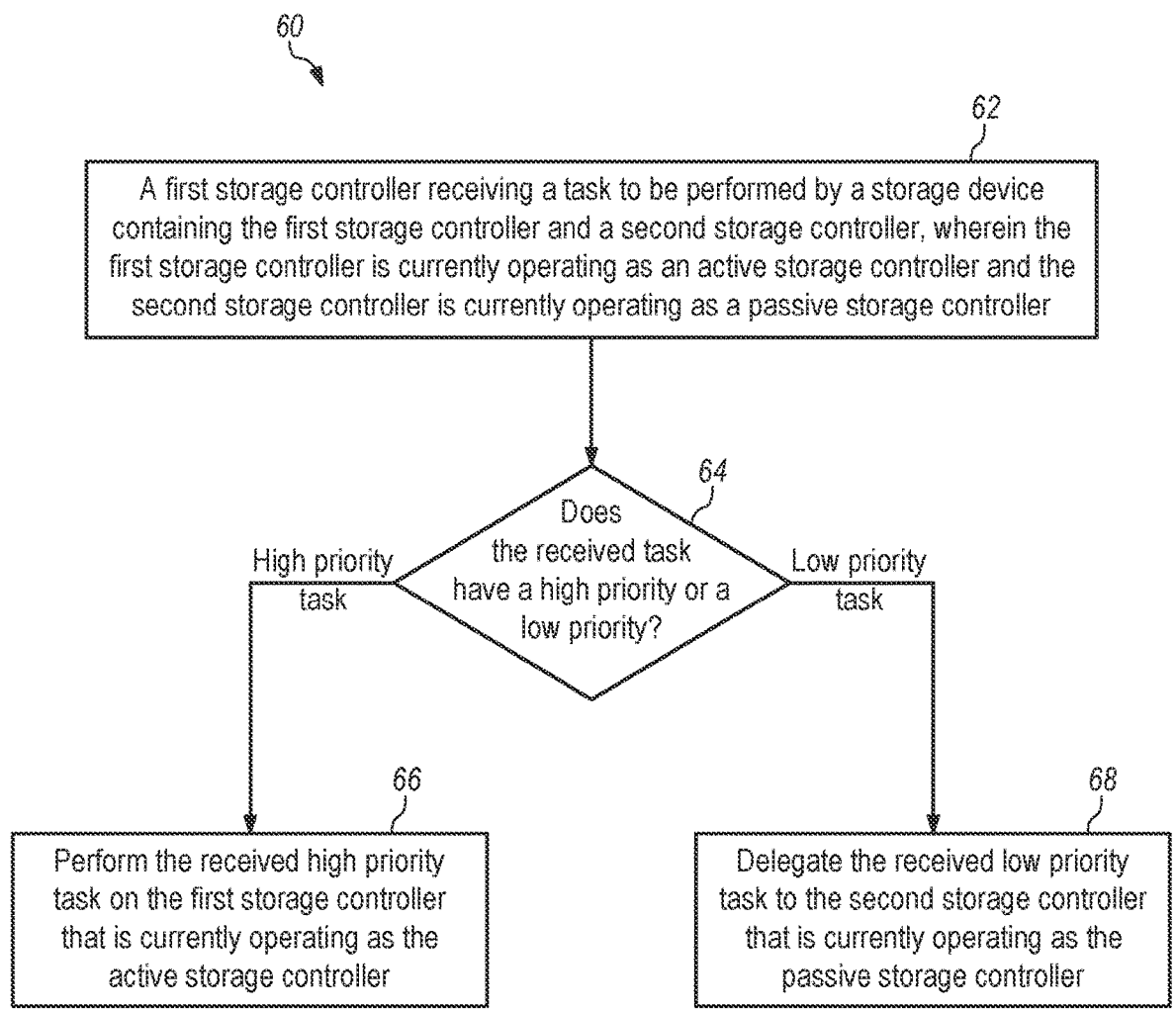
FIG. 3 is a flowchart of a method performed by a first data storage controller that is currently operating as an active storage controller.

FIG. 3 is a flowchart of operations 60 to be performed by a first data storage controller that is currently operating as an active storage controller. The active and passive storage controllers within the storage device may execute logic to distribute or delegate tasks between the active storage controller and the passive storage controller according to the priority level of each task. In operation 62, a first storage controller receiving a task to be performed by a storage device containing the first storage controller and the second storage controller, wherein the first storage controller is currently operating as an active storage controller and the second storage controller is currently operating as a passive storage controller. In operation 64, the first storage controller determines whether the received task has a high priority or a low priority. This comparison and determination are performed by the first storage controller because it is currently operating as the active storage controller. If the first storage controller determines in operation 64 that the received task has a high priority, then the first storage controller performs the received high priority task in operation 66. However, if the first storage controller determines in operation 64 that the received task has a low priority, then the first storage controller delegates the received low priority task to the second storage controller that is currently operating as the passive storage controller per operation 68. Accordingly, the CPU and memory resources of the passive controller are used to perform the received low priority task.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions being configured to be executable by a processor of a first storage controller to cause the processor to perform operations comprising:
receiving a task to be performed by a storage device including the first storage controller, a second storage controller and a storage media, wherein the first storage controller is operating as an active storage controller and the second storage controller is operating as a passive storage controller, wherein the active storage controller has exclusive access to the storage media;
determining whether the received task has a high priority or a low priority;
performing the received task in response to determining that the received task has a high priority; and delegating the received task to the second storage controller in response to determining that the received task has a low priority.

2. The computer program product of claim 1, the operations further comprising:

storing a list of tasks and a predetermined priority associated with each task, wherein determining whether the received task has a high priority or a low priority includes identifying the received task in the list of tasks and reading the predetermined priority associated with the received task.

3. The computer program product of claim 2, the operations further comprising:

receiving the list of tasks and the predetermined priority associated with each task over a network from a cloud controller application.

4. The computer program product of claim 1, the operations further comprising:

storing a list of task types and a predetermined priority associated with each task type, wherein determining whether the received task has a high priority or a low priority includes identifying a task type for the received task and identifying the predetermined priority associated with the identified task type.

5. The computer program product of claim 1, the operations further comprising:

receiving a notification from the second storage controller that the received task delegated to the second storage controller has been completed.

6. The computer program product of claim 1, wherein the task is received over a network from a cloud controller application.

7. The computer program product of claim 6, wherein the cloud controller application is run on a compute node in the same network as the storage device.

8. The computer program product of claim 7, wherein the compute node and the storage device are included in a composable private cloud.

9. The computer program product of claim 6, wherein the cloud controller application is run on a public cloud.

10. The computer program product of claim 1, wherein the task is received over a network from a virtual machine running on a compute node in the same network as the storage device.

11. The computer program product of claim 10, wherein determining whether the received task has a high priority or a low priority includes receiving a priority associated with the task from the virtual machine.

12. The computer program product of claim 10, wherein the virtual machine is assigned a virtual disk exposed as an iSCSI target by the active storage controller.

13. The computer program product of claim 1, wherein the received task is determined to have a high priority in response to receiving the task from a virtual machine running on a compute node in the same network as the storage device.

14. The computer program product of claim 1, wherein the second storage controller automatically begins operating as the active storage controller and the first storage controller automatically begins operating as the passive storage controller in response to a failover event.

15. The computer program product of claim 2, wherein the list of tasks includes template creation and image conversion each having a predetermined association with a low priority, and wherein the list of tasks includes a storage task having a predetermined association with a high priority.

16. The computer program product of claim 1, the operations further comprising:

automatically restarting the delegated task on the first storage controller in response to a failover event causing the first storage controller to begin operating as the active storage controller and the second storage controller to begin operating as the passive storage controller.

17. The computer program product of claim 1, the operations further comprising:

storing state information for the delegated task in a configuration file on local memory of the second storage controller;

syncing the configuration file to local memory of the first storage controller; and automatically resuming a delegated task on the first storage controller in response to a failover event causing the first storage controller to begin operating as the active storage controller and the second storage controller to begin operating as the passive storage controller.

18. A data storage device, comprising:

at least one data storage drive;

first and second storage controllers operating in active-passive mode, wherein one of the first and second storage controllers operates as an active storage controller and the other of the first and second storage controllers operates as a passive storage controller, and wherein the active storage controller controls reading and writing to the at least one data storage drive, each of the first and second storage controllers including:

at least one non-volatile storage device storing program instructions; and at least one processor configured to process the program instructions, wherein the program instructions are configured to, when processed by the at least one processor, cause the processor to perform operations comprising:

receiving a task to be performed by a storage device containing the first storage controller and a second storage controller;

determining whether the received task has a high priority or a low priority;

performing the received task in response to determining that the received task has a high priority; and delegating the received task to the second storage controller in response to determining that the received task has a low priority.

19. The data storage device of claim 18, the operations further comprising:

storing a list of tasks and a predetermined priority associated with each task, wherein determining whether the received task has a high priority or a low priority includes identifying the received task in the list of tasks and reading the predetermined priority associated with the received task.

20. The data storage device of claim 19, the operations further comprising:

receiving the list of tasks and the predetermined priority associated with each task over a network from a cloud controller application.

* * * * *